United States Patent
Wang et al.

(10) Patent No.: US 11,669,603 B2
(45) Date of Patent: Jun. 6, 2023

(54) CLOTHING PATTERN MAKING MANAGEMENT SYSTEM

(71) Applicant: KWONG LUNG ENTERPRISE CO., LTD., Taipei (TW)

(72) Inventors: Jui-Wen Wang, Taipei (TW); Chia-Hua Chang, Taipei (TW); Chun-Lung Ho, Taipei (TW)

(73) Assignee: KWONG LUNG ENTERPRISE CO., LTD., Taipei (TW)

( * ) Notice: Subject to any disclaimer, the term of this patent is extended or adjusted under 35 U.S.C. 154(b) by 340 days.

(21) Appl. No.: 16/895,280

(22) Filed: Jun. 8, 2020

(65) Prior Publication Data
US 2021/0378339 A1 Dec. 9, 2021

(51) Int. Cl.
*A41H 3/00* (2006.01)
*G06F 21/31* (2013.01)
*G06F 18/2431* (2023.01)

(52) U.S. Cl.
CPC ........... *G06F 21/31* (2013.01); *A41H 3/007* (2013.01); *G06F 18/2431* (2023.01); *G06F 2221/2141* (2013.01)

(58) Field of Classification Search
CPC ........ A41H 3/007; A41H 43/00; G06F 21/31; G06F 2221/2141; G06F 3/0482; G06F 3/04845; G06F 2113/12; G06F 15/16; G06F 19/00; G06K 9/628; G06Q 10/06315; G06Q 30/0621; G06Q 30/0643; G06T 2210/16; G05B 2219/35008; G05B 2219/35012; G05B 2219/45222; D10B 2501/06; D10B 2501/04
See application file for complete search history.

(56) References Cited

U.S. PATENT DOCUMENTS

| | | | | |
|---|---|---|---|---|
| 9,633,333 B2* | 4/2017 | Krizmanich | ............ | G06Q 10/10 |
| 10,043,109 B1* | 8/2018 | Du | ........ | G06V 10/764 |
| 10,817,749 B2* | 10/2020 | Biswas | ................ | G06V 10/764 |
| 11,000,086 B2* | 5/2021 | Mahanty | ............ | D06B 11/0096 |
| 11,241,055 B2* | 2/2022 | Love | ................... | G06Q 30/0621 |
| 2021/0110464 A1* | 4/2021 | Tufegdzic | ............. | G06F 16/583 |

FOREIGN PATENT DOCUMENTS

| | | | | |
|---|---|---|---|---|
| CN | 102096862 A | 6/2011 | | |
| CN | 102750417 A | 10/2012 | | |
| CN | 104537047 B | 1/2018 | | |
| CN | 108335173 A | 7/2018 | | |
| JP | 2002222224 A | 8/2002 | | |
| KR | 102260796 B1 * | 6/2021 | ............ | A41H 3/007 |
| TW | I607329 B | 12/2017 | | |
| TW | M601421 U | 9/2020 | | |

* cited by examiner

*Primary Examiner* — Khoa D Huynh
*Assistant Examiner* — Grace Huang
(74) *Attorney, Agent, or Firm* — Rabin & Berdo, P.C.

(57) ABSTRACT

A clothing pattern making management system, applicable to a server and used for allowing users to connect and manage a plurality of clothing pattern making data via a network, at least including a database and a login and authority management module, a search and viewing module, a connection and upload module, and a management and download module. Through the data connection to a business system, the system is able to facilitate the users to perform data upload and management in order to achieve proper preservation and management of a large quantity of pattern drawings for various styles of clothes and for all stages, and to achieve the effects of learning exchange and passing on of techniques.

8 Claims, 2 Drawing Sheets

CLOTHING PATTERN MAKING MANAGEMENT SYSTEM

BACKGROUND OF THE INVENTION

1. Technical Field

The present invention relates to a system management system, and in particular, to clothing pattern making management system applicable to the clothing design industry and capable of being linked to a business system in order to facilitate the management of design patterns at all stages and to allow developers to perform design revert and review.

2. Description of Related Art

For the clothing design industry, there are typically a great quantity of patterns associated with the design of one style of clothing, and it can be classified into large and small pattern sheets. The large pattern sheet refer to the style drawing, it combines the pattern drawings (such as marker making), and the small pattern sheet (parts pattern drawing) refers to the design drawings of each part, such as hat, collar, pocket, body, body front part, pants front part, body rear part, pants rear part, sleeve part (including sleeve opening), waist band, lining etc. Consequently, the design of a style of clothing typically includes dozens and tenths pieces of design patterns. For a complicated design style, it may even include hundred or several hundreds of design patterns, such that the management of all patterns is extremely difficult.

In addition, for one style of clothing, from design to manufacturing, it may involve more than one set of patterns. For an apparel company, it typically involves initial patterns created during the initial stage of the design during the order receipt, modified patterns after modification, size fitting predefined according to the sales targets, pre-production samples, testing samples and shipping samples etc., such that there are numerous sets of different patterns. In view of such large quantity of patterns, presently, there is no proper preservation or management method in the industry, and it mostly relies on the developer (designer) personal habits or non-permanent method for preservation. As a result, even different developers in one identical company may still have difficulty in searching past data and making technical communications. Moreover, it may even cause difficulty to new comers to search previous designs for learning purposes. Consequently, it can cause the issues of low personnel training efficiency and difficulty in passing on techniques and knowledge. As a result, there is a need to overcome such drawbacks in this field.

BRIEF SUMMARY OF THE INVENTION

A primary objective of the present invention is to provide a clothing pattern making management system, capable of implementing proper preservation and management on the pattern drawings of each style of clothing and each stage effectively through data connection and linkage while providing convenient search functions through the use of identification labels, thereby allowing all users to operate, learn and share according to their authorities and achieving the effect of preservation and passing on of techniques.

To achieve the aforementioned effects and objectives, the present invention provides a clothing pattern making management system, mainly applicable to a server and providing an operation interface for individuals to connect thereto via a network in order to manage a plurality of clothing pattern making data. In addition, the clothing pattern making management system of the present invention mainly adopts the technique of connecting a data base to the server, and the database is stored with a plurality of user data and a plurality of clothing pattern data; each one of the clothing pattern data comprising a plurality of pattern drawings and an identification label of each one of the pattern drawings; the identification label of each one of the pattern drawings (i.e. the aforementioned pattern drawings) comprising a plurality of classification item characteristics. In addition, the server further includes a login and authority management module, a search and viewing module, a connection and upload module as well as a management and downloading module; wherein the login and authority management module is provided for an administrator to set up the plurality of user data and an operation authority of each one of the users, and provided for the individuals to log in via the network and matching with the plurality of user data in order to determine as the users or the administrator; the search and viewing module is provided for the users already logged in to use any one or a plurality of classification items to find the characteristics matching with one or a plurality of the pattern drawings and displaying on the operation interface, and allowing the users to view and select the pattern drawings on the operation interface; the connection and upload module is capable of being connected to a business system and provided for the users already logged in and equipped with the corresponding operation authority to obtain the classification item characteristics of the clothing pattern making data to be uploaded, and to allow the users to upload the clothing pattern data to be uploaded according to the classification item; the management and download module is provided for the users already logged in and equipped with corresponding operation authority to edit, delete or download one or a plurality of the pattern drawings selected on the operation interface.

According to the aforementioned system architecture, wherein the plurality of pattern drawings of each clothing pattern making data refer to at least one overall marker making pattern drawing (i.e. such as the aforementioned large pattern sheet, style drawing or marker making pattern drawing) and a plurality of parts pattern drawings (i.e. such as the aforementioned small pattern sheet or pattern parts drawing), and an identification label of the overall marker making pattern drawing and identification labels of the plurality of parts pattern drawings of one identical clothing have the same number of sets of the plurality of classification item characteristics.

According to the aforementioned system architecture, wherein the identification label of each one of the pattern drawings refers to a file name, a search path or an annotation of each one of the pattern drawings.

According to the aforementioned system architecture, wherein the search and viewing module is further connected to a preview module; the preview module is used for converting thumbnails of one or a plurality of the pattern drawings in order to display the one or a plurality of the pattern drawings searched by the search and viewing module on the operation interface.

According to the aforementioned system architecture, wherein the connection and upload module is further connected to an inspection module; the inspection module is used to inspect a file type or the identification label of each one of the pattern drawings for uploading the clothing pattern making data.

According to the aforementioned system architecture, wherein each one of the classification item characteristics in an identification label of each one of the pattern drawings refers to a classification code, and the identification label of each one of the pattern drawings is formed by the classification codes of numerous classification items.

According to the aforementioned system architecture, wherein the plurality of pattern drawings of each clothing pattern making data refer to at least one overall marker making pattern drawing and a plurality of parts pattern drawings, and the identification label of the overall marker making pattern drawings and the identifications of the plurality of parts pattern drawings have the same number of sets of classification codes.

According to the aforementioned system architecture, wherein the plurality of classification items of an identification label of each one of the overall marker making pattern drawings refer to any combination of more than two classification items of a consigner classification, a style classification, a season classification, a wearing classification, a function classification, a factory classification and a development stage classification.

According to the aforementioned system architecture, wherein the plurality of classification items of an identification label of each one of the parts pattern drawings refer to any combination of more than two classification items of a parts classification, a gender classification, an age classification, a consigner classification, a style classification, a season classification, a wearing classification and a function classification.

In view of the above, the present invention mainly allows development pattern drawings and relevant documents of patterns and marker making patterns at all stages to be preserved in a database effectively in order to allow proper recording and recovery of any data for problems and modification records encountered during the development process, thereby facilitating relevant personnel to perform data search with easy and allowing new comers to learn and share the pattern making and marker making techniques swiftly.

Based on the principle of records for all actions performed during design, the present invention provides a clothing pattern making management system to allow all users to revert back the design history and to pass on techniques with ease, such that it is advantageous to corporate management or technical exchange, and it also facilitates relevant technical personnel to perform research and search, thereby documenting experience and digitizing knowledge for operations to continue for at least another 50 years.

DETAILED DESCRIPTION OF THE INVENTION

Figure 1:
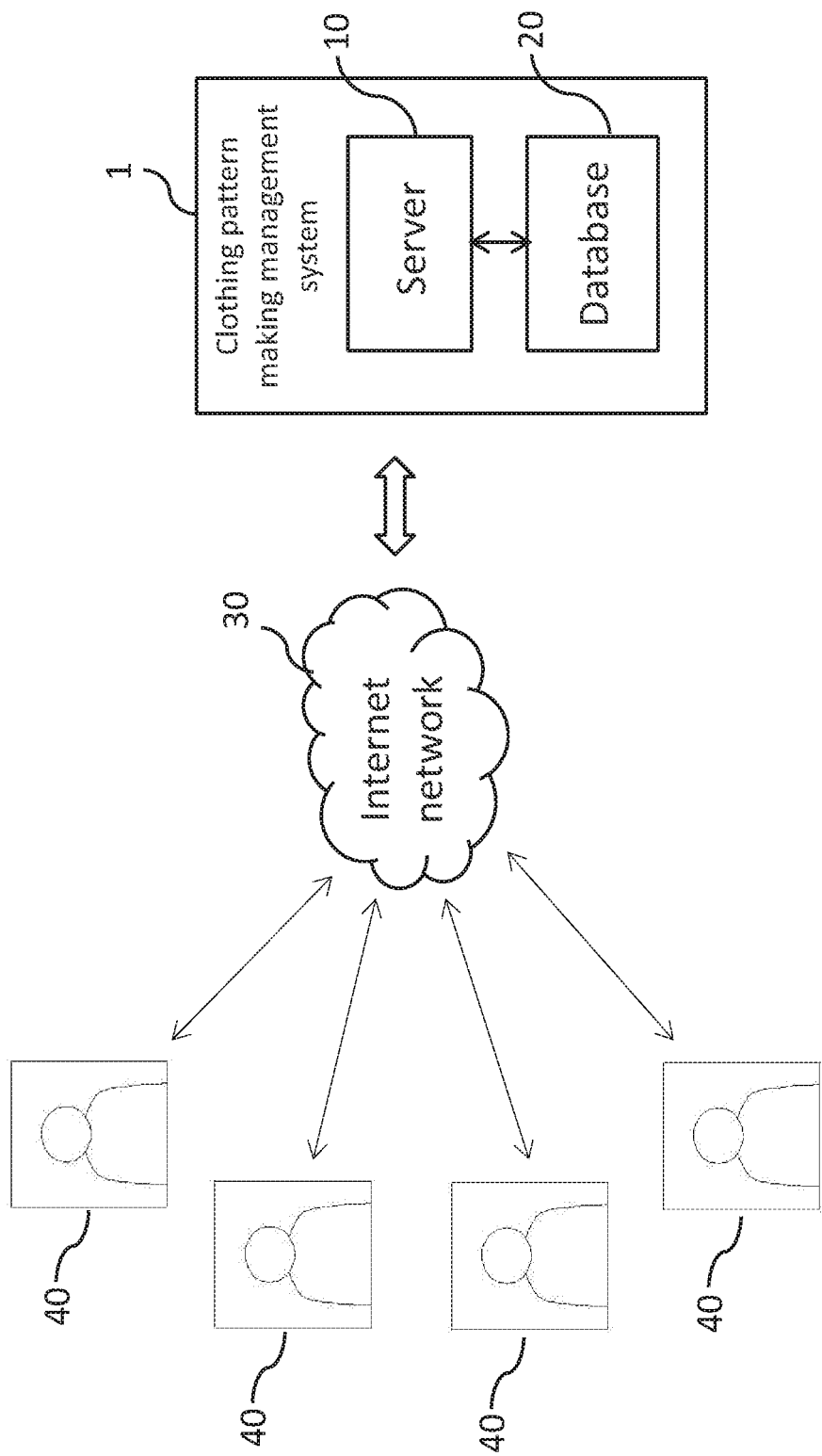
FIG. 1 is a connection relationship diagram according to a preferred embodiment of the present invention.
Figure 2:
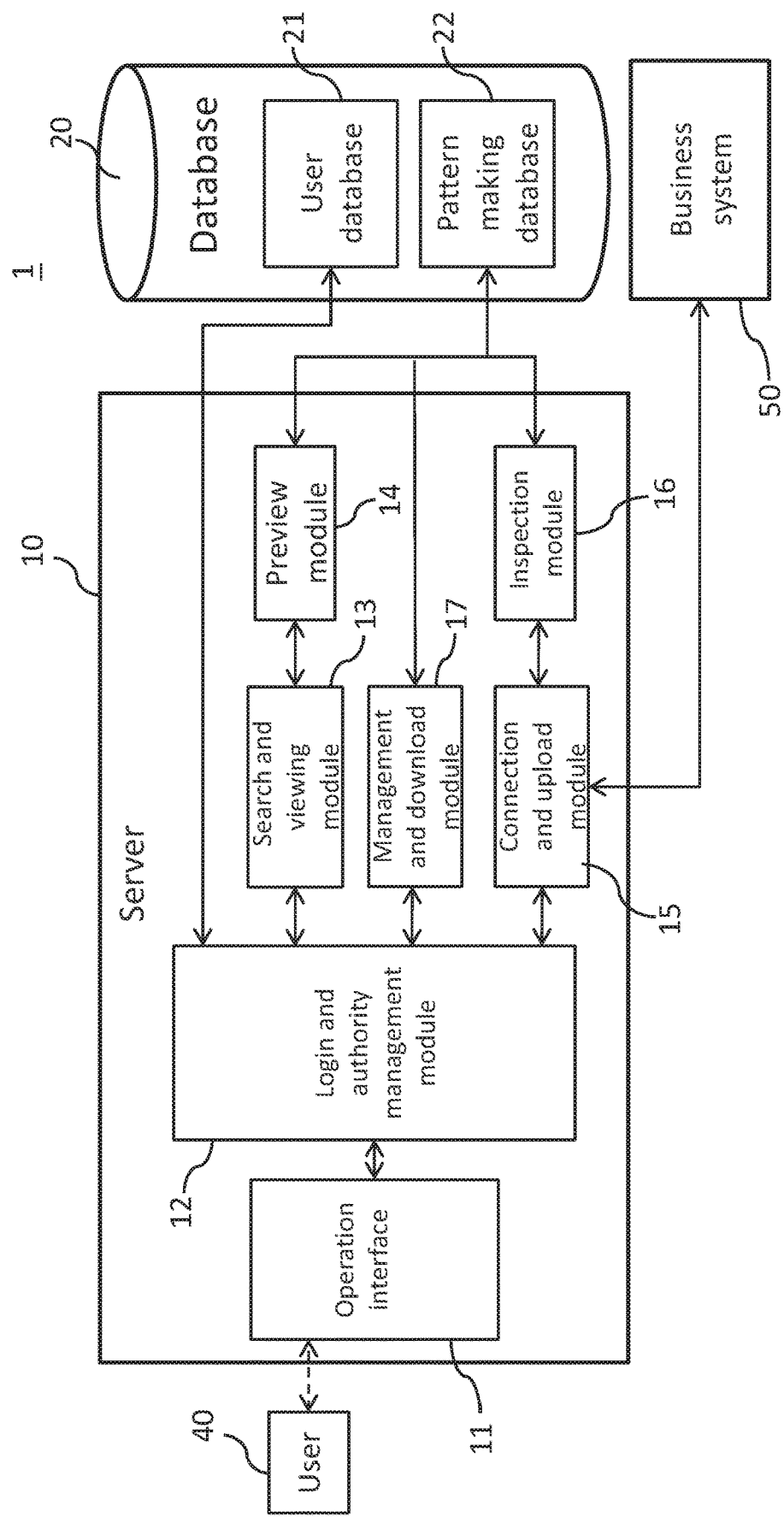
FIG. 2 is a schematic view of a system architecture diagram according to a preferred embodiment of the present invention.

Please refer to FIG. 1 and FIG. 2, showing a clothing pattern making management system 1 of the present invention. Its primary architecture comprises a server 10 and a database 20. In addition, the clothing pattern making system 1 can be provide for a plurality of individuals for connection and use through internet network 30.

The database 20 of the clothing pattern making management system 1, at least comprises the parts of a user database 21 and a pattern making database 22. The user database 21 is used for storing a plurality of user related information, such as account number, password, operation authority etc. The pattern making database 22 is used for storing a plurality of clothing pattern making data; wherein each one of the clothing pattern making data comprises a plurality of pattern drawings and an identification label of each one of the pattern drawings. The pattern drawings refer to at least one overall marker making pattern drawing (i.e. the so-called style drawing or pattern drawing, such as marker making pattern) and a plurality of parts pattern drawings (i.e. the so-called pattern parts drawing). In addition, the identification label of each one of the pattern drawings comprises a plurality of classification item characteristics. Furthermore, the database 20 can also be established with database of other portions according to the needs in order to uniformly store relevant data of other production and development, such as working hour documents, filling material ratio documents etc.

The server 10 mainly provides an operation interface 11 for individuals to connect thereto through internet network 30, and it at least includes a login and authority management module 12, a search and viewing module 13, a preview module 14, a connection and upload module 15, an inspection module 16 and a management and download module 17.

In addition, the login and authority management module 12 is connected to the user database 21, and it is provided for an administrator to set up the plurality of user data and an operation authority of each one of the users, and it also provides a login page or window for the individuals to perform the login action when the individuals are logging in the operation interface 11 via the internet network 30. It also performs matching with the plurality of user data in the user database 21 in order to determine whether each one of the individuals logging in is a user or an administrator as well as to determine the permitting operation authority of the users. In this embodiment, the user authorities can be classified into four levels, and they can be generally divided according to the functions as: Level 1 for permission on online viewing only (i.e. regular account), Level 2 for permission on uploading and online viewing (i.e. intermediate account), Level 3 for permission on uploading, downloading, deletion, editing and online viewing (i.e. advanced account), and Level 4 for permission on the operation of all functions aforementioned (i.e. administrator account).

The search and viewing module 13 and the preview module 14 are connected to the pattern making database 22, and are mainly provided for the users already logged in to use any one or a plurality of classification items to perform data search operation (a function that is available to accounts of all levels), and it finds one or a plurality of classification item characteristics matching with one or a plurality of the pattern drawings, and also displays these pattern drawings on the operation interface 11 in order to allow the users to select the pattern drawing file and to view the pattern drawing selected on the operation interface 11. Furthermore, the preview module 14 is able to automatically convert these pattern drawings (mdl drawing files) into thumbnails for preview when the search and viewing module 13 displays one or a plurality of the pattern drawings searched on the operation interface 11, thereby displaying the thumbnails on the operation interface 11 altogether.

The connection and upload module 15 and the inspection module 16 are connected to the pattern making database 22, and they are mainly provided for the users already logged in and equipped with the corresponding operation authority to perform the pattern drawing upload operation on the operation interface 11 (a function available to the intermediate, advanced and administrator accounts). The connection and upload module 15 can be connected to a business system 50 and to obtain data necessary for conversion from the business system 50. In this embodiment, the business system 50 is an ERP (Enterprise Resource Planning) system, used for storing all clothing project related data, such as customers and orders etc. In addition, through the connection and upload module 15, when a user is performing the upload operation, it is able to connect to the business system 50 in order to retrieve the classification item characteristics necessary for the clothing pattern making data to be uploaded, and then upload the corresponding clothing pattern making data individually onto the pattern making database 22, thereby allowing the system to automatically complete the index action according to the classification item. Furthermore, the inspection module 16 is able to inspect whether the data for upload is correct when the connection and upload module 15 is uploading the clothing pattern making data, including such as inspecting the file type of pattern drawings of each version and the identification label of the pattern drawings of each version.

The management and download module 17 is connected to pattern making database 22, and it is mainly provided for the users already logged in and equipped with corresponding operation authority to perform pattern drawing download operation (a function available to the advanced and administrator accounts). It can be used in conjunction with the search and viewing module 13 to allow the users to perform operations altogether. After searching the predefined one or a plurality of the pattern drawing list on the operation interface 11, one or a plurality of the pattern drawings desired are selected in order to perform the operations of editing, deletion or download.

In an embodiment of the present invention, for each one of the pattern drawings stored in the database 20, its identification label can be a file name, a search path or an annotation of the pattern drawing. In addition, the identification label of the overall marker making pattern drawing and the identification labels of the parts pattern drawings of one identical clothing have the same number of sets of classification item characteristics. In addition, the classification item characteristic of the identification label refers to a classification code (such as the use of wearing for classification, and the corresponding code for clothes is C, the corresponding code for pants is P, the corresponding code for jumpsuit is J, and the corresponding code for shoes is S etc.). Furthermore, the identification label of each one of the pattern drawings is formed by the classification codes of a plurality of classification items.

In a feasible embodiment of the present invention, the identification label classification item of an overall marker making pattern drawing can be a combination of the consigner classification, style classification, season classification, wearing classification, function classification, factory classification and development stage classification etc. For example, the consigner corresponding code is AAA, the style corresponding code is 0, the season corresponding code is F19, the wearing corresponding code is C, the function corresponding code is W, the factory corresponding code is Y, the development stage corresponding code is F, following by combining with a serial number, the identification label of the overall marker making pattern drawing can be identified as AAA0F19CW-YF00. With regard to the identification label classification item of a parts pattern drawing, it can be a combination of the pattern drawing parts classification, gender classification, age classification, consigner classification, style classification, season classification, wearing classification and function classification etc. For example, the parts corresponding code is CAP, the gender/age corresponding code is M, the consigner corresponding code is AAA, the style corresponding code is 0, the season corresponding code is F19, the wearing corresponding code is C and the function corresponding code is W, then the identification label of the parts pattern drawing can be identified as CAP-MAAA0F19CW.

Moreover, the overall marker making pattern drawing and parts pattern drawings of one identical clothing project have the same number of sets of classification codes, such that when a user is using the present invention for operation, he or she is able to find all relevant pattern drawing data with ease, thereby facilitating the preservation and management of pattern making data and achieving the effect of providing convenient operation to users and allowing users to learn and share techniques easily.

Nevertheless, it shall be understood that the content of the above description is provided to illustrate the preferred embodiments of the present invention only such that it shall not be used to restrict the claim scope of the present invention. Accordingly, any mere modifications and equivalent structural changes made based on the disclosure of the specification and drawings of the present invention shall be considered to be within the claim scope of the present invention.

What is claimed is:

1. A clothing pattern making management system, applicable to a server and providing an operation interface for individuals to connect thereto via a network in order to manage a plurality of clothing pattern making data, the clothing pattern making management system comprising:
   a database storing a plurality of user data and the plurality of clothing pattern making data; each one of the clothing pattern making data comprising a plurality of pattern drawings and an identification label of each one of the pattern drawings; the identification label of each one of the pattern drawings comprising a plurality of classification item characteristics;
   a login and authority management module provided for an administrator to set up the plurality of user data and an operation authority of each one of the users, and provided for the individuals to log in via the network and matching with the plurality of user data in order to determine as the users or the administrator;
   a search and viewing module provided for the users already logged in to use any one or a plurality of classification items to find the characteristics matching with one or a plurality of the pattern drawings and displaying on the operation interface, and allowing the users to view the pattern drawings selected on the operation interface;
   a connection and upload module for connecting to a business system and provided for the users already logged in and equipped with the corresponding operation authority to obtain the classification item characteristics of the clothing pattern making data to be uploaded, and to allow the users to upload the clothing pattern making data to be uploaded according to the classification item; and
   a management and download module provided for the users already logged in and equipped with corresponding operation authority to edit, delete or download one or a plurality of the pattern drawings selected on the operation interface;

wherein the plurality of pattern drawings of each clothing pattern making data refer to at least one overall marker making pattern drawing and a plurality of parts pattern drawings, and the identification label of the at least one overall marker making pattern drawing and the identification labels of the plurality of parts pattern drawings of one identical clothing have a same number of sets as the plurality of classification item characteristics.

2. The clothing pattern making management system according to claim 1, wherein the identification label of each one of the pattern drawings refers to a file name, a search path or an annotation of each one of the pattern drawings.

3. The clothing pattern making management system according to claim 1, wherein the search and viewing module is further connected to a preview module; the preview module is used for converting thumbnails of one or a plurality of the pattern drawings in order to display the one or a plurality of the pattern drawings searched by the search and viewing module on the operation interface.

4. The clothing pattern making management system according to claim 1, wherein the connection and upload module is further connected to an inspection module; the inspection module is used to inspect a file type or the identification label of each one of the pattern drawings of the clothing pattern making data to be uploaded when the connection and upload module uploads the clothing pattern making data.

5. The clothing pattern making management system according to claim 1, wherein each one of the classification item characteristics in the identification label of each one of the pattern drawings refers to a classification code, and the identification label of each one of the pattern drawings is formed by the classification codes of numerous classification items.

6. The clothing pattern making management system according to claim 5, wherein the plurality of pattern drawings of each clothing pattern making data refer to at least one overall marker making pattern drawing and a plurality of parts pattern drawings, and the identification label of the at least one overall marker making pattern drawings and the identification labels of the plurality of parts pattern drawings of one identical clothing have a same number of sets as the plurality of the classification codes.

7. The clothing pattern making management system according to claim 6, wherein the plurality of classification items of the identification label of the at least one overall marker making pattern drawings refer to any combination of more than two classification items of a consigner classification, a style classification, a season classification, a wearing classification, a function classification, a factory classification and a development stage classification.

8. The clothing pattern making management system according to claim 7, wherein the plurality of classification items of the identification label of each one of the parts pattern drawings refer to any combination of more than two classification items of a parts classification, a gender classification, an age classification, a consigner classification, a style classification, a season classification, a wearing classification and a function classification.

\* \* \* \* \*